J. C. WOBERMAN.
RIVETING TOOL.
APPLICATION FILED MAY 4, 1909.
948,265.
Patented Feb. 1, 1910.
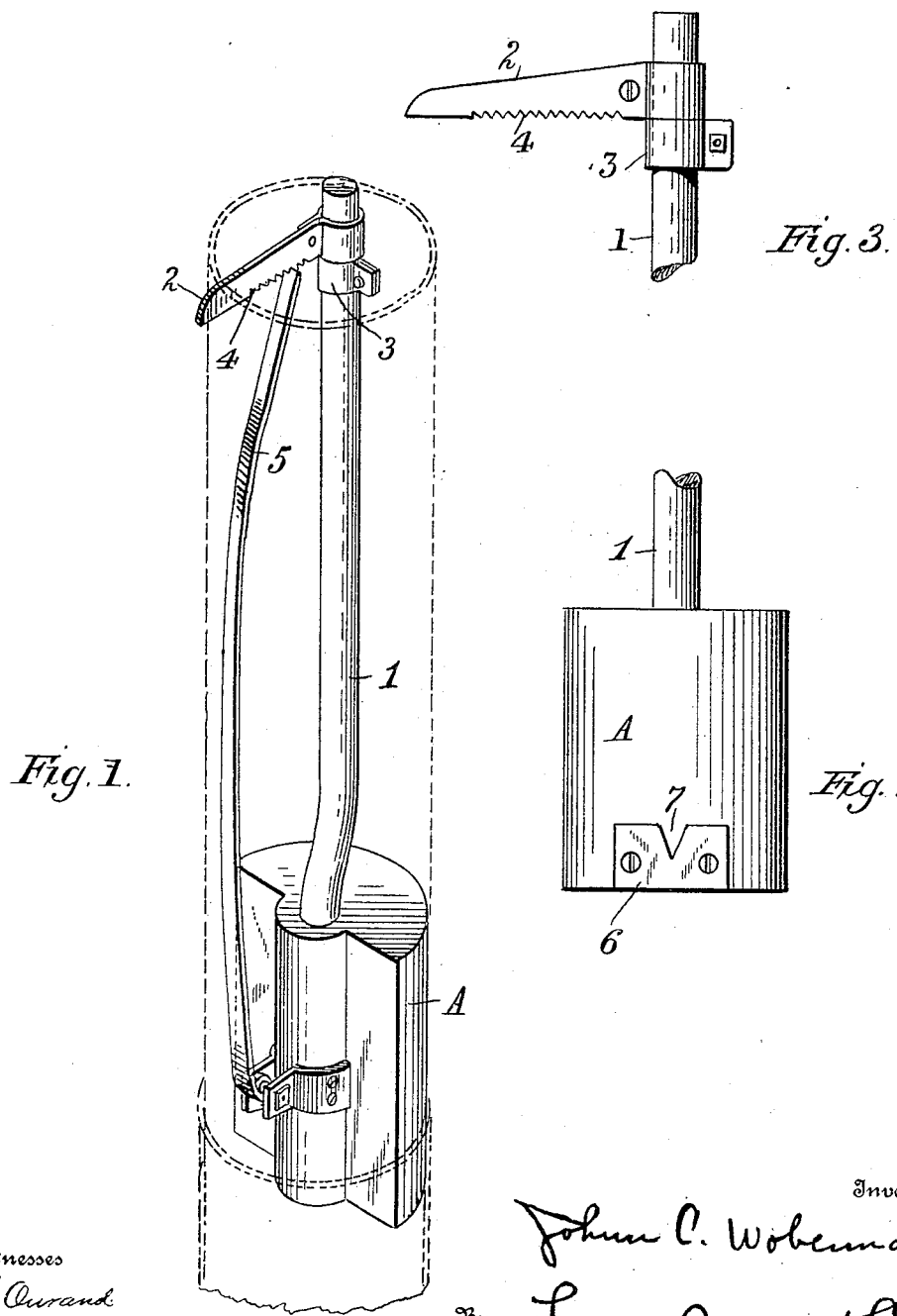

UNITED STATES PATENT OFFICE.

JOHNN CHRIS WOBERMAN, OF BRUSH, COLORADO.

RIVETING-TOOL.

948,265.  Specification of Letters Patent.  Patented Feb. 1, 1910.

Application filed May 4, 1909. Serial No. 493,898.

*To all whom it may concern:*

Be it known that I, JOHNN CHRIS WOBERMAN, a citizen of the United States, residing at Brush, in the county of Morgan and State of Colorado, have invented certain new and useful Improvements in Riveting-Tools, of which the following is a specification.

My invention relates to an improvement in a riveting tool, and the object is to provide means for holding the tool in position within a pipe or casing and against the wall or inner surface of the pipe through which the rivet is to be driven and clenched.

The invention consists of certain other novel features of construction and combinations of parts, which will be hereinafter described and pointed out in the claims.

In the accompanying drawings:—Figure 1 is a view in perspective, Fig. 2 is a rear view, and Fig. 3 is a detail.

A represents the head, which is practically semicircular in shape, and connected to the head is a shaft 1. A beam or arm 2 is adjustably connected to the shaft and is adapted to rest on the top of the pipe or casing to be riveted for holding the head in the proper position. A collar 3 is mounted on the shaft to hold the arm in its adjusted position. The arm is provided on its under surface with teeth 4, which are engaged by the upper end of the spring member 5, which is pivotally connected to the head A. A plate or clip 6, is connected to the front or curved surface of the head A and is provided with a V-shaped slot 7, in which is held the rivet to be driven through the pipe or casing.

When it is desired to connect two sections of a pipe or casing together the head is inserted in the pipe the desired distance and the arm 2 is adjusted along the shaft 1 for supporting the head within the pipe the desired distance. The spring member 5 is brought into engagement with the teeth on the arm, which causes the spring member to bend outwardly and against the wall of the pipe or casing, thereby holding the head against the wall of the casing through which the rivet is to be driven. With a light blow of the hammer the rivet can be located and after the rivet is forced through the pipe or casing, a few more blows applied will clench it. This tool can be made in different sizes to suit different requirements, and the spring member will always hold the head against the wall or inner surface of the pipe whereby the rivet can be driven through two sections of pipe.

It is evident that more or less slight changes might be made in the form and arrangement of the several parts described without departing from the spirit and scope of my invention, and hence I do not wish to be limited to the exact construction herein set forth, but:—

Having fully described my invention, what I claim as new and desire to secure by Letters Patent, is:—

1. A riveting tool comprising a head, a shaft connected to the head, an arm adjustably connected to the shaft, a spring member connected to the head adapted to be brought into engagement with the arm for holding the head in position for the riveting operation and means on the head for carrying the rivet.

2. A riveting tool comprising a head, a shaft connected to the head, an arm adjustably connected to the shaft, teeth on the arm, a spring member pivotally connected to the head adapted to engage the wall of the pipe for holding the head against the opposite wall and the free end of the member engaging the teeth on the arm and a plate on the head for carrying the rivet.

In testimony whereof I affix my signature, in the presence of two witnesses.

JOHNN CHRIS WOBERMAN.

Witnesses:
 LEOPOLD BERTRAND,
 ALBERT C. LUSBY.